July 26, 1932.　　　A. BLACKIE　　　1,868,623
METHOD AND APPARATUS FOR THE MEASUREMENT OF HEAT
Filed May 19, 1926
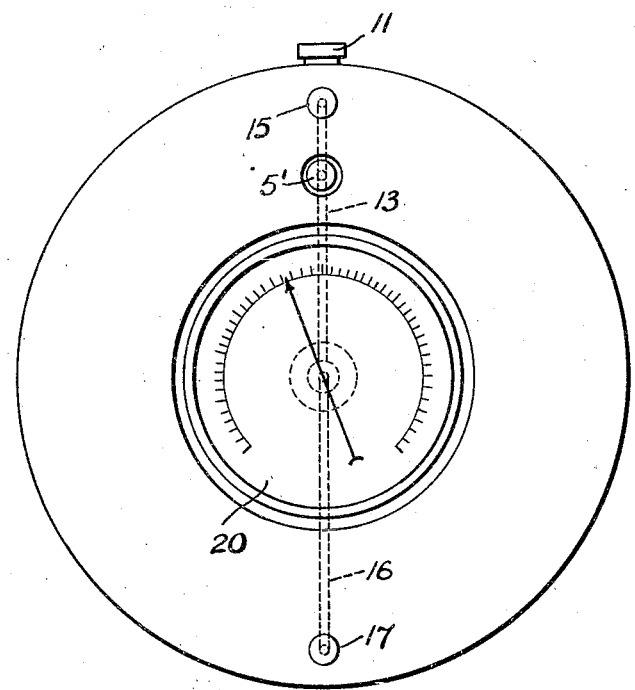
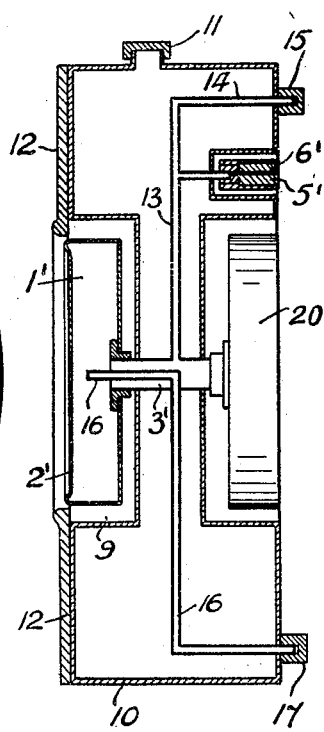
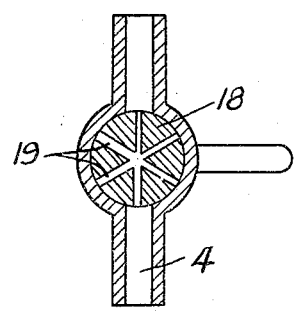
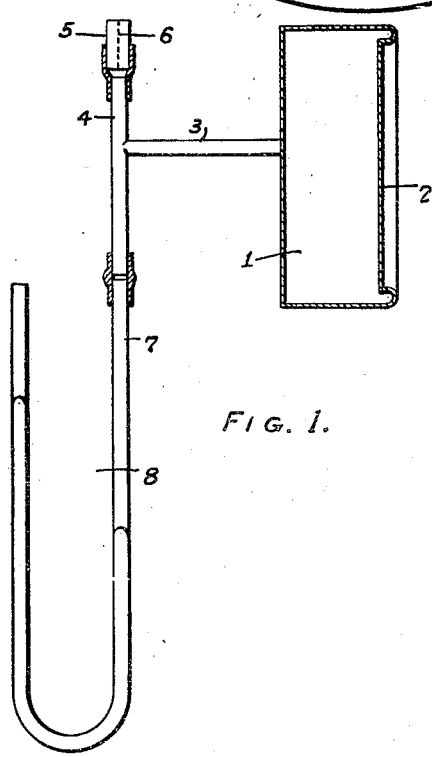
INVENTOR
ALFRED BLACKIE
BY Richards & Geier
ATTORNEYS Patented July 26, 1932

1,868,623

UNITED STATES PATENT OFFICE

ALFRED BLACKIE, OF LONDON, ENGLAND

METHOD AND APPARATUS FOR THE MEASUREMENT OF HEAT

Application filed May 19, 1926, Serial No. 110,055, and in Great Britain May 29, 1925.

This invention relates to the measurement of heat and particularly to a method and apparatus for measuring the rate of flow of heat through a heat transmitting surface or the rate of heat emission from a source, the invention having for its object to provide an improved method of and apparatus for the measurement of transmitted or emitted heat whereby this measurement can be readily and effectively carried out and the result indicated or recorded in a simple and effective manner and with sufficient accuracy for practical and commercial purposes.

According to the present invention it is arranged that the flow of heat to be measured shall be imparted to a body of fluid enclosed in a suitable container which is provided with an outlet capable of permitting a definite restricted rate of flow of the fluid from the container as this fluid expands under the action of the heat imparted thereto. Since the rate of flow of the fluid is dependent upon the pressure obtaining within the container this pressure will, as heat is supplied to the fluid, increase until the resultant rate of flow of the fluid is sufficient to balance the rate of expansion in volume of the fluid in the container under the heating action. A state of equilibrium is thus established which will persist until the rate of expansion due to the heat becomes less than the rate of loss of fluid due to flow from the container whereupon the pressure will begin to fall and will finally reach equality with the external pressure.

Since the pressure within the container during the period of equilibrium above referred to is for a given fluid and capacity of outlet dependent upon the rate of expansion of the fluid and consequently upon the rate of supply of heat thereto, by providing any suitably calibrated indicating or recording device, a direct indication or record of the rate of supply of heat will be obtained.

In carrying the invention into practice air will in most cases be the most suitable and convenient fluid to employ, and in order that the nature of the invention may be clearly understood a simple form of apparatus embodying the invention will now be described with reference to the accompanying drawings, of which Figure 1 is a diagrammatic view illustrating the principle of the invention; Figure 2 is a side elevation of a simple form of apparatus embodying the invention and adapted for use as a surface calorimeter: Figure 3 is a medial vertical sectional view of the apparatus shown in Figure 2; and Figure 4 is a sectional view of an alternative form of a portion of the apparatus shown in Figure 1, or in Figures 2 and 3.

Referring now first to Figure 1, it will be seen that the apparatus comprises a chamber 1 of approximately cylindrical form composed of sheet metal or other suitable material, one of the circular faces of the chamber 1, namely that indicated at 2, being arranged to be exposed to the flow of heat to be measured, the surface 2 being preferably blackened or otherwise rendered heat absorbing, while the remainder of the surface of the chamber 1 is polished so as to prevent any appreciable absorption or loss of heat other than through the selected surface 2.

The chamber 1 is connected by means of a pipe 3 with a vertical pipe 4, the upper end of which is provided with a plug 5 traversed by a capillary passage 6 forming a restricted outlet to the chamber 1. The lower end of the pipe 4 is connected to the arm 7 of a U-tube manometer, or pressure gauge, 8, containing mercury or other suitable liquid.

In operation the chamber 1 is arranged so that its heat absorbing surface 2 is exposed to the flow of heat to be measured, with the result that the air in the chamber 1 will expand as it is heated, the manometer, or pressure gauge, 8, indicating the pressure obtained within the chamber 1 by the corresponding difference of level of the mercury in the two arms of the manometer tube, as shown in the drawings. During the expansion air will escape to the atmosphere through the restricted outlet constituted by the capillary passage 6 until the pressure obtaining within the chamber 1 is sufficient to cause a rate of flow of air through the outlet which is sufficient to balance the rate of expansion of the air within the chamber 1 due to the absorption of heat. The pressure as indicated by the pressure gauge 8 will thus rise to a steady value which is maintained for a period of time long enough to enable a reading or record of the pressure to be obtained, the pressure eventually beginning to decrease, owing to loss of air through the outlet and ultimately falling to the atmospheric pressure.

The calibration of the apparatus may be effected experimentally by exposing the container to different known rates of flow of heat. For instance, a pair of containers may be arranged with their heat absorbing surfaces on opposite sides of a flat resistance heating element to which electric currents of various magnitudes are supplied, thus ensuring the supply of heat at a number of different known rates to the absorbing surfaces of the containers, these two surfaces being interchanged, if necessary, in order to provide the necessary check on the observations.

In another method of calibration, the heat absorbing surfaces of the apparatus may be exposed to the heat emitted from a heat radiating body maintained at different known temperatures, the heat absorbing surface of the apparatus being arranged to be so located as to intersect a definite cone of the heat rays emitted by the source, suitable screens or other devices being employed for this purpose.

The range of the instrument can be varied by providing a number of plugs 5, each having a capillary passage 6, of different capacity, one or other of these plugs being utilized in accordance with the range of measurement required. In the alternative arrangement illustrated in Figure 4 the upper end of the pipe 4 may be provided with a plug cock, the movable element 18 of which is traversed by a number of capillary passages 19 of different cross-sectional areas so that by setting the member 19 of the cock to one or another of its different angular positions, a selected one of the passages 19 may be rendered operative as an outlet for fluid from the container 1.

The pressure gauge employed may be of the type illustrated in the drawings, or a pressure gauge of the aneroid, Bourdon tube, or other suitable type may be utilized.

The apparatus may be employed for measuring the rate of flow of radiant, conductive, or convective heat, or of radiant heat only, through a heat transmittive surface such, for instance, as a boiler or retort setting, by in the first case arranging the heat absorbing surface of the apparatus closely adjacent to the heat transmitting surface or, in the second case, by arranging the heat absorbing surface in the path of radiant heat emitted from a source and out of reach of convective heat, the apparatus may be employed as a total radiation calorimeter of pyrometer.

In another application the chamber or container of the apparatus may be arranged to be immersed in a heated medium, the rate of flow of heat into the fluid within the chamber under the temperature gradient from the heated medium to the fluid which is effected under these conditions constituting a measure of the temperature of the heated medium, so that the apparatus operates as a thermometer or pyrometer.

It will be understood that after the expiration of the period of equilibrium above referred to, the chamber or container of the apparatus must be allowed to cool before a further measurement can be effected, two valves being preferably provided for the more rapid adjustment of pressures, and for sweeping out the heated fluid by the admission of fresh fluid at a normal temperature.

Referring now to the apparatus shown in Figures 2 and 3, the container 1' is in this case located in a recess 9 in an outer container 10 serving as a water-jacket for the apparatus. The container 10 is provided with an upper opening provided with a cap 11 for filling the container 10, the face of the container surrounding the active surface 2' of the container 1' being covered by heat insulating material 12.

The interior of the container 1' is connected by means of a tube 3' with a pressure gauge 20 of the aneroid type, a branch pipe 13 leading from the tube 3' being connected to the outlet plug 5' provided with a capillary passage 6', this plug being located in a recess in the water jacket container 10 as illustrated. The plug 5' may be arranged to be held in position in any suitable manner, as for instance by providing an external screw-thread on the plug adapted to engage with a corresponding internal screw-thread in the hollow seating in which the plug is inserted, said seating being held in place by soldering it to the water jacket or by any other suitable means. An extension of the pipe 13 leads to a pipe 14 the outer end of which passes through the wall of the container 10 and is provided with a cap 15.

A pipe 16 is provided projecting into the interior of the container 1', the opposite end of this pipe traversing the wall of the container 10 and being provided with a cap 17.

The water-jacket container 10 serves to protect the portions of the container 1' other than the active surface 2' from stray heat absorption or loss due to radiation or otherwise and also protects the plug 5' and the pipe connection 3' and 13 leading thereto from change in temperature so that the fluid, when flowing into or out of the container 1' and through the orifice, is maintained at a constant temperature regardless of changes in the temperature of the fluid within the container 1'. In operation, the water-jacket container 10 is filled with water after the removal of the cap 11 and the apparatus is then placed in position against the surface of a boiler or retort setting for instance, the insulating material 12 being in contact with the surface so that the active surface 2' of the container 1' is traversed by the flow of heat through the surface of the setting.

While the apparatus is thus held in position the maximum reading of the pressure gauge 20 is observed and an indication of the rate of flow of heat through the setting is thus obtained.

After the measurement has been effected the apparatus may be restored to its original condition by removing the caps 15 and 17 and sweeping out the heated fluid from the container 1' by forcing air through the pipe 16 preferably by means of a small hand pump, the heated air escaping through the pipes 13 and 14.

The caps 15 and 17 are subsequently replaced whereupon the apparatus can be employed for effecting a further measurement.

It will be evident to those familiar with such measurements that by utilizing the principle of balancing the rate of expansion of a fluid against its rate of escape from a container a much more rapid and easier determination of the rate of flow of heat can be effected than would be possible by the observation of the rate of rise in the reading of a thermometer of known thermal capacity and that furthermore the invention enables a rate of flow of heat to be measured by a single reading of the maximum pressure indicated, the time required for such measurement being sufficiently short as to render negligible the local changes of surface conditions of the body from which the heat is emitted, or through which the flow of heat is taking place, which usually occur when any form of surface thermometer is intimately applied to a heated body.

Although the improved apparatus of the invention has been above described by way of example as arranged to measure the rate of flow of heat into the fluid contained in the chamber 1 from a source emitting heat, it will be seen that the apparatus can also be utilized for measuring the rate of flow of heat through the surface 2 in the opposite direction, as, for instance, in cases in which it is desired to measure the rate of flow of heat into a heat absorbing body. In such cases the heat contained in the air or other fluid within the chamber 1 will flow out of the container with the result that the pressure therein will fall, due to the contraction of the fluid, and fluid will be admitted to the chamber 1 through the capillary passage 6, or its equivalent, the pressure gauge in this case indicating or recording the equilibrium pressure attained when the rate of flow of fluid into the chamber 1 is sufficient to balance the rate of the contraction of the fluid within the chamber due to loss of heat. The apparatus is thus suitable for measuring, for instance, the efficiency of the heat insulating wall or lagging of a refrigerating chamber in which a relatively low temperature is to be maintained.

The improved apparatus of the invention can evidently be adapted or designed for any desired range of measurement by varying the capacity of the container, the character of the working fluid employed and the nature and dimensions of the restricted passage which may be constituted by a capillary orifice, a small aperture in a plate or other suitable device.

It will be understood that the invention is not limited to any particular constructional form or arrangement of apparatus nor to the use of any particular gas or liquid as the working fluid, variations in these and other respects being evidently desirable in order to meet particular conditions.

Having now described my invention, what I claim as new and desire to secure by Letters Patent is:—

1. In apparatus for the measurement of heat, the combination of a container which is entirely closed except for a restricted passage communicating with a space at constant pressure, said container originally enclosing a definite limited body of fluid, a portion of said container constituting a heat receiving surface, means for protecting the remainder of said container from the transmission of heat therethrough, and means for measuring the fluid pressure within said container.

2. In apparatus for the measurement of heat, the combination of a container originally enclosing a limited body of fluid, means for establishing a restricted communication of constant capacity between the exterior and the interior of said container, means for measuring the pressure of said fluid, and means for maintaining said communication-establishing means at a predetermined constant temperature.

3. In apparatus for the measurement of heat, the combination of a container originally enclosing a limited body of fluid and having a restricted passage communicating with a space at constant pressure, a portion of said container constituting a heat receiving surface, and means other than said passage for establishing communication between the interior of said container and the atmosphere so as to re-establish normal pressure conditions within said container.

4. In apparatus for the measurement of heat, the combination of a container which is entirely closed except for a restricted passage communicating with a space at constant pressure, said container originally enclosing a definite limited body of fluid, a portion of said container constituting a heat receiving surface, a water-jacket for protecting the remainder of said container from the transmission of heat therethrough, and means for measuring the fluid pressure within said container.

5. In apparatus for the measurement of heat, the combination of a container enclosing a limited body of fluid and having a passage communicating with a space at constant pressure, a nozzle located in said passage, means for maintaining said nozzle at a constant temperature, a portion of said container receiving heat from the exterior and means for measuring the pressure obtaining within said container.

6. The method of measuring the rate of flow of heat, which includes, subjecting a body of fluid to changes produced therein by the heat-flow to be measured, said fluid body being completely inclosed, save for a restricted passage leading therefrom to a space having constant pressure, measuring the resulting pressure changes produced in the fluid and particularly noting the pressure when it remains substantially constant for an appreciable time.

7. In apparatus for the measurement of heat, the combination of a container originally enclosing a limited body of fluid, a movable member having a restricted passage establishing continuous communication between the container and a space at constant pressure, a portion of said container constituting a heat-receiving surface, and means for measuring the pressure obtaining within said container.

8. In apparatus for the measurement of heat, the combination of a container enclosing a limited body of fluid and having a space continuously communicating through a passage with a space at constant pressure, a removable nozzle element located in said passage, a portion of said container constituting a heat-receiving surface, and means for measuring the pressure obtaining within said container.

In witness whereof I have hereunto set my hand.

ALFRED BLACKIE.